United States Patent
Leo et al.

(10) Patent No.: US 7,669,894 B2
(45) Date of Patent: Mar. 2, 2010

(54) AIRBAG ARRANGEMENT HAVING THRUST-NEUTRAL OUTLET CROSS-SECTIONS OF THE GAS GENERATOR

(75) Inventors: Josephine Leo, Göteborg (SE); Peter Axelsson, Vargarda (SE); Jan Mazanek, Billdal (SE); Niclas Johannson, Allingsas (SE); Ken Lindberg, Vargarda (SE); Per Hellberg, Boras (SE)

(73) Assignee: Autoliv Development AB, Vargarda (SE)

( * ) Notice: Subject to any disclaimer, the term of this patent is extended or adjusted under 35 U.S.C. 154(b) by 377 days.

(21) Appl. No.: 11/721,322

(22) PCT Filed: Dec. 1, 2005

(86) PCT No.: PCT/EP2005/012806

§ 371 (c)(1),
(2), (4) Date: Jun. 8, 2007

(87) PCT Pub. No.: WO2006/061131

PCT Pub. Date: Jun. 15, 2006

(65) Prior Publication Data

US 2009/0236838 A1   Sep. 24, 2009

(30) Foreign Application Priority Data

Dec. 11, 2004  (DE) ............... 20 2004 019 183 U
Feb. 9, 2005   (DE) ............... 20 2005 002 049 U
Mar. 1, 2005   (DE) ............... 20 2005 003 280 U

(51) Int. Cl.
   *B60R 21/16*   (2006.01)
(52) U.S. Cl. .................. 280/742; 280/736; 280/730.2
(58) Field of Classification Search .......... 280/742, 280/736, 730.2, 740, 741
   See application file for complete search history.

(56) References Cited

U.S. PATENT DOCUMENTS

| | | | |
|---|---|---|---|
| 6,293,581 B1 * | 9/2001 | Saita et al. ............ | 280/730.2 |
| 6,318,754 B1 * | 11/2001 | Einsiedel et al. ......... | 280/736 |
| 6,601,871 B2 * | 8/2003 | Fischer ................ | 280/730.2 |
| 6,802,532 B2 * | 10/2004 | Heigl et al. ............ | 280/736 |
| 6,811,184 B2 * | 11/2004 | Ikeda et al. ............ | 280/742 |
| 6,846,010 B2 * | 1/2005 | Enders ................. | 280/730.2 |
| 6,877,771 B2 * | 4/2005 | Weber ................. | 280/742 |
| 7,021,652 B2 * | 4/2006 | Kumagai et al. .......... | 280/729 |
| 7,052,037 B2 * | 5/2006 | Nakayasu et al. ......... | 280/730.2 |
| 7,264,267 B2 * | 9/2007 | Kino et al. ............. | 280/728.2 |
| 7,278,659 B2 * | 10/2007 | Takahara .............. | 280/743.2 |

(Continued)

FOREIGN PATENT DOCUMENTS

DE   19850448 A1   5/2000

(Continued)

*Primary Examiner*—Paul N Dickson
*Assistant Examiner*—Drew Brown
(74) *Attorney, Agent, or Firm*—Brinks Hofer Gilson & Lione

(57) ABSTRACT

An airbag system is disclosed comprising a gas generator and an airbag having at least two inflatable airbag regions. The airbag regions are attached to the gas generator by an interconnecting a T-shaped connecting piece having symmetrically opposed outlet stubs with differently sized outlet cross-sections for inflating the airbag regions. In order to neutralize the thrust of the system in case of accidental fire, several means for controlling the outlet cross-section on at least one of the outlet stubs are disclosed.

16 Claims, 3 Drawing Sheets

U.S. PATENT DOCUMENTS

2003/0141708 A1* 7/2003 Enders .................... 280/730.2
2003/0178827 A1* 9/2003 Dinsdale et al. ............. 280/736
2007/0035112 A1* 2/2007 Takahara ................. 280/730.2
2007/0257475 A1* 11/2007 Fukuda et al. .............. 280/736
2008/0309056 A1* 12/2008 Ohba ...................... 280/730.2

FOREIGN PATENT DOCUMENTS

GB          2390576          1/2004

* cited by examiner

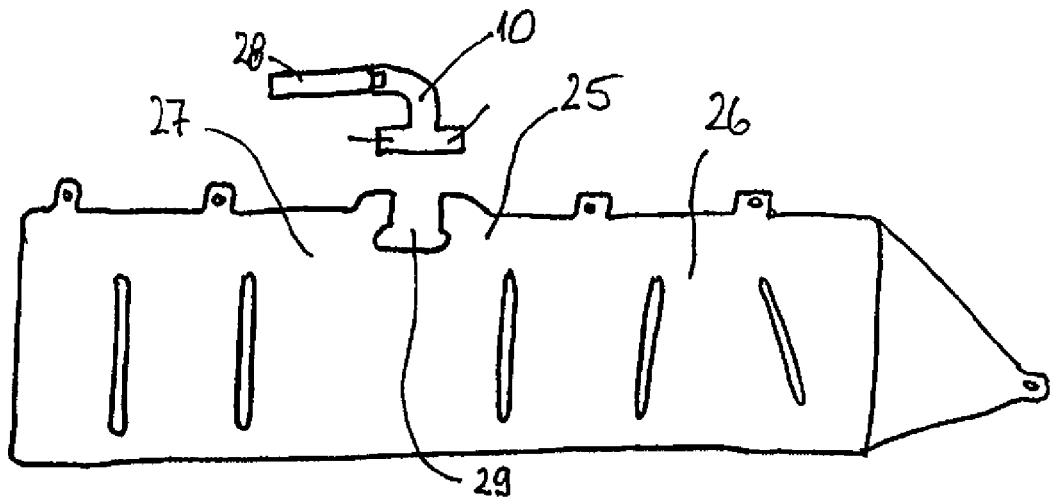
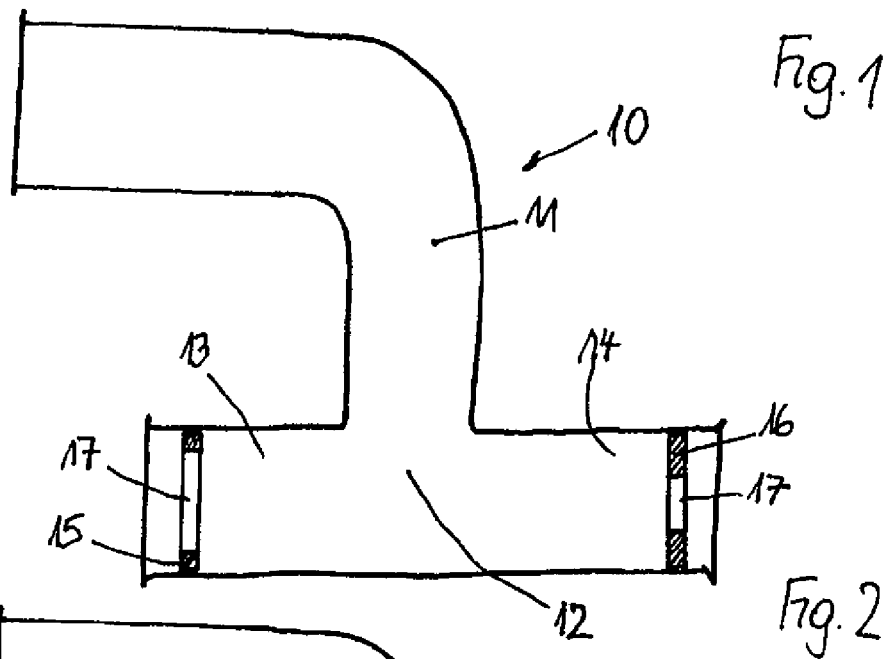
Fig. 1
Fig. 2
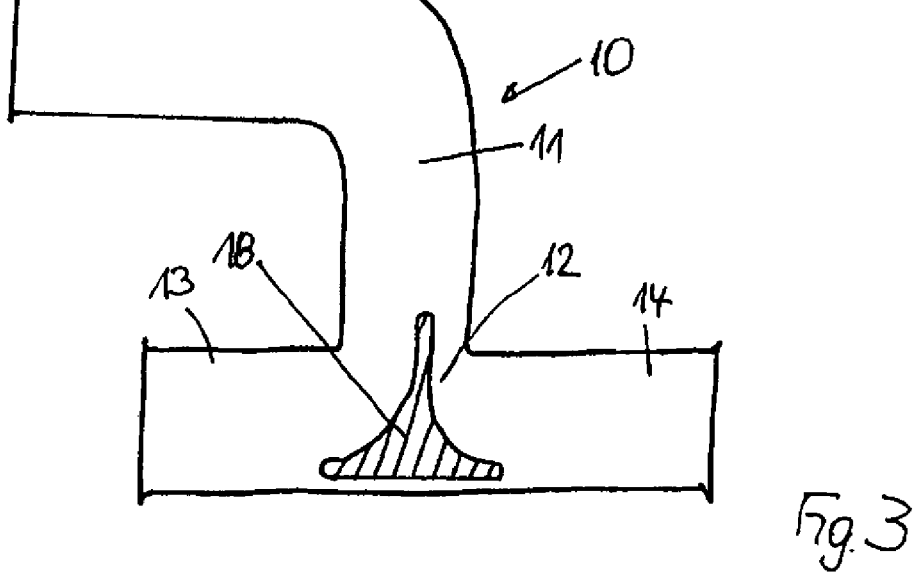
Fig. 3

AIRBAG ARRANGEMENT HAVING THRUST-NEUTRAL OUTLET CROSS-SECTIONS OF THE GAS GENERATOR

CROSS REFERENCE TO RELATED APPLICATIONS

This application claims priority to PCT/EP2005/012806, filed Dec. 1, 2005, having international publication number WO 2006/061131 A1.

BACKGROUND OF THE INVENTION

The invention relates to an airbag arrangement comprising a gas generator and an airbag having at least two inflatable airbag regions, wherein both airbag regions are attached to the gas generator by interconnecting a T-shaped connecting piece having outlet stubs of different outlet cross-sections.

This type of airbag arrangement is described for example in EP 0 808 257 B1, in which the attachment for the gas generator is located between two airbag regions to be filled. Although a T-shaped connecting piece for connecting the gas generator to the two airbag regions to be attached is not explicitly presented, the necessity of a connecting piece configured in this manner, wherein the outlet channels of the connecting piece inevitably can or must be embodied differently as a function of the volume of the respectively attached airbag region, said outlet channels leading to the attached airbag regions, is evident to the person skilled in the art. An airbag arrangement of this type having front and rear airbag regions featuring different filling volumes is disclosed in GB 2 390 576 A, for example.

If it is necessary to store and, in particular, transport an airbag arrangement of this type prior to its assembly in a motor vehicle, it cannot be excluded that an unintentional triggering of the gas generator can occur due to external influences, such as in the event of an accidental building fire. There therefore exists a requirement on airbag arrangements of this type, that the airbag arrangement behave thrust-neutral in such a case, that is, no recoil effect that causes a movement of the connecting piece in the airbag arrangement to occur in one direction or the other. Since the T-shaped connecting piece must have different outlet cross-sections if a T-shaped connecting piece is to be used in an airbag arrangement described in GB 2 390 576 A, there exists the associated disadvantage that the requirement for a thrust-neutral configuration of the airbag arrangement cannot be met.

It is therefore the problem of the invention to equip an airbag arrangement having the features specified in the introduction in such a manner that, if the gas generator is triggered before the airbag arrangement is installed in a vehicle, no movement of the connecting piece will occur in spite of the fact that the outlet stubs of the connecting piece have differently acting outlet cross-sections when in the installed state.

The solution of this problem, including advantageous embodiments and developments of the invention, arises from the content of the claims, which follow this description.

SUMMARY OF THE INVENTION

To this end, the basic idea of the invention is that, in order to adjust the different outlet cross-sections in a connecting piece, which is symmetrically built with respect to its outlet stubs, means for controlling the outlet cross-section are provided on at least one of the outlet stubs, each of which demonstrates a discharge opening on its face, said means being of such a type that the airbag arrangement behaves thrust-neutral in a fire.

In a first embodiment, the invention provides that an insert, which is made of non-heat-resistant material, is arranged in at least one of the outlet stubs of the connecting piece, reducing the cross-section of said outlet stub. This embodiment is thus based on the principle that, in a symmetrically configured T-shaped connecting piece, the insert arranged in the outlet stub adjusts the respective cross-section of the respective outlet stub in question to conform to the different volumes of the respectively attached airbag regions. If an undesired triggering of the gas generator should occur, in the event of a fire for example, then the respective insert in the outlet stub will burn off because of the heat effect so that the complete flow cross-section of the respective outlet stub is opened. The recoils or thrust forces, which are generated by the feeding of the gas that is released when the airbag is triggered, cancel because of the symmetrical construction of the T-shaped connecting piece so that the airbag arrangement behaves thrust-neutral in the desired manner.

In one embodiment, it is provided that the insert consists of a bolt introduced into the outlet stub from the outside of the connecting piece through a boring configured in the wall of the outlet stub, the section of the bolt lying within the outlet stub consisting of a non-heat-resistant material.

To this end, it can also be provided that the bolt can be screwed into the boring and that its open end reaches the opposite wall of the connecting piece, wherein the sections of the bolt lying within the walls of the connecting body consist of a heat-resistant material.

In an alternative embodiment, it can be provided that the insert consists of a baffle plate, which can be inserted into the outlet stub and has a defined outlet cross-section, wherein in a development, it can be provided that baffle plates having different outlet cross-sections are inserted into the outlet stubs of the T-shaped connecting piece.

It can again be alternatively provided that the insert consists of a three-armed baffle body inserted into the connecting area between the outlet stub and the central inlet stub attached to the gas generator.

In a second embodiment of the invention, it is provided that a plurality of radially oriented discharge borings is additionally arranged on at least one of the outlet stubs that features a discharge opening of identical cross-section on its face, said discharge borings being arranged in a rotationally symmetric distribution over the perimeter of the outlet stub. This embodiment is thus based on the principle that, in a T-shaped connecting piece, which is basically configured symmetrically and in which the discharge openings configured on the faces of the two outlet stubs each have identical cross-sections, the total desired larger discharge volume on one of the two outlet stubs is produced by installing additional discharge borings in the outlet stub in question, said discharge borings being in a rotationally symmetric distribution over the perimeter. If an undesired triggering of the gas generator should occur, in the event of a fire for example, then the recoils or thrust forces generated on the discharge openings of the faces of the outlet stubs by feeding the released gases into the outlet stubs will for the present cancel. If additional discharge borings are installed on one of the two outlet stubs, a radial gas flow without an axial thrust component will result; since the discharge borings are also distributed rotationally symmetric over the perimeter of the outlet stub in question, the radially oriented discharge forces likewise cancel. Overall, the airbag arrangement thus behaves thrust-neutral in the desired manner.

In one embodiment of this example embodiment of the invention, it is provided that the plurality of discharge borings is arranged in a plane aligned perpendicular to the longitudinal axis of the outlet stub.

In an alternative embodiment, it can be provided that, in addition to the discharge borings arranged in a first plane, other discharge borings are arranged in a rotationally symmetric distribution in a second plane that is parallel to and axially apart from the first plane, wherein it can be provided that the discharge borings arranged in the first plane and in the second plane are each arranged offset to one another by an angle.

In regard to the attachment of the airbag region to the outlet stubs that are provided with discharge borings, it can be provided according to alternative example embodiments of the invention that the attached airbag region is either directly attached to the outlet stub in an overlap of the discharge boring or else is indirectly fixed to the outlet stub by interconnecting a connecting hose pulled over the outlet stub.

In a third embodiment of the invention, it is provided that a bushing, which consists of a non-heat-resistant material and the face of which has an opening of smaller cross-section than the cross-section of the outlet stub, is arranged on at least one outlet stub and fixed to the connecting piece. This embodiment is thus based on the principle that, in a symmetrically configured T-shaped connecting piece, the bushing pushed onto an outlet stub and the opening that is arranged in the face of said bushing and that demonstrates a smaller cross-section than the cross-section of the outlet stub adjust the cross-section of the outlet stub in question to conform to the different volumes of the respectively attached airbag regions. If an undesired triggering of the gas generator should occur, in the event of a fire for example, then the bushing seated on the associated outlet stub will burn off because of the heat effect so that the complete flow cross-section of the respective outlet stub is opened. The recoils or thrust forces, which are generated by the feeding of the gas that is released when the airbag is triggered, cancel because of the symmetrical construction of the T-shaped connecting piece so that the airbag arrangement behaves thrust-neutral in the desired manner.

According to an embodiment, it is provided that a bushing is pushed onto the outlet stub.

To facilitate the mounting of the bushing on the associated outlet stub, it can be provided that the bushing demonstrates at least one slot extending at least over a portion of its longitudinal length so that the bushing can expand when pushed onto the outlet stub. To this end, it can be provided in particular that two slots are arranged opposite one another on the ring-shaped bushing.

So that the slots will not tear open during the assembly of the bushing on the outlet stub, it can be provided that the slots each terminate in a stop hole.

To further secure the bushing on the outlet stub in its assembly position, it can be provided that the outside of outlet stub is provided with a surrounding flange and that the inside wall of the bushing demonstrates a surrounding groove for forming a positive-fit connection with the flange. In principle, it can be provided that a collar band, which is provided to fix the airbag fabric to the outlet stubs, secures the bushing in its fitting arrangement on the outlet stub.

In an alternative embodiment, it can also be provided that the bushing is internally pushed into the outlet stub and fixed within the outlet stub.

Additional benefits and advantages of the present invention will become apparent to those skilled in the art to which the present invention relates from the following description of the embodiments and claims, taken in conjunction with the accompanying drawings.

BRIEF DESCRIPTION OF THE DRAWINGS

FIG. 1 is a schematic representation of an airbag arrangement;

FIG. 2 is a schematic representation of a T-shaped connecting piece, which is to be inserted into an airbag arrangement and which has an associated baffle plate insert;

FIG. 3 is a representation of a T-shaped connecting piece having a three-armed baffle insert;

DETAILED DESCRIPTION OF THE INVENTION

Figure 4:
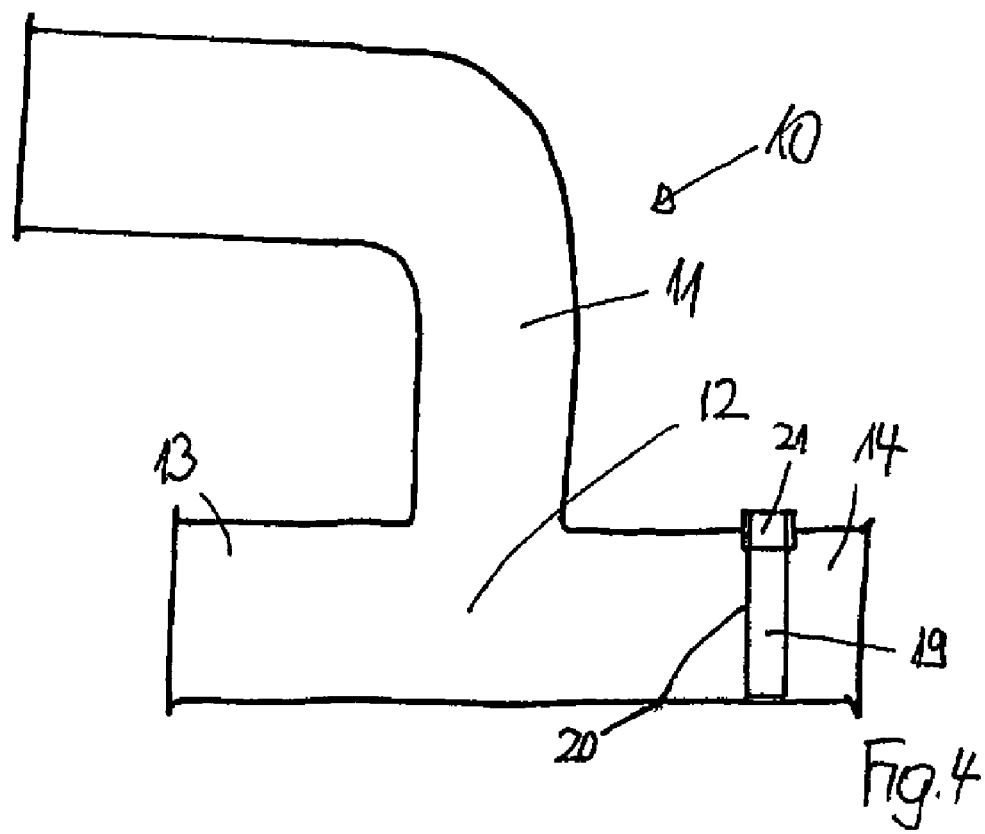
FIG. 4 is a representation of a T-shaped connecting piece having a bolt insert.

The following description of embodiments is merely exemplary in nature and is in no way intended to limit the invention or its applications or uses.

FIG. 1 depicts an airbag arrangement with an airbag 25 having two airbag regions 26 and 27 to be inflated. A gas generator 28 is provided approximately in the center of the airbag 25, said gas generator being attached by means of a T-shaped connecting piece 10, to the airbag regions 26 and 27 to be inflated, the attachment taking place by inserting said T-shaped connecting piece into an appropriately configured attachment region 29 of the airbag 25. To this end, the airbag regions 26 and 27 are each attached to outlet stubs 13 and 14, respectively, configured in the connection piece.

The connecting piece 10 illustrated in detail in FIG. 2 has an inlet channel 11, which is attached to the gas generator 28 and to which two outlet stubs are attached via a connection area 12. A first baffle plate 15 is inserted into the first outlet channel 13 and a second baffle plate 16 is inserted into the second outlet channel 14, wherein the baffle plates 15, 16 each have different outlet cross-sections 17, the configurations of which are matched to the different inflated volumes of the respectively attached airbag regions 26, 27 of the airbag arrangement. To this end, the baffle plates 15, 16 consist of a non-heat-resistant material so that the baffle plates 15, 16 will melt under the action of heat in the event of a fire and a corresponding undesired activation of the gas generator, thereby opening the complete flow cross-section of the outlet stubs 13, 14, which are symmetrically configured in this respect. When the gas flowing in through the inlet channel 11 discharges through outlet stubs 13 and 14, the recoil or thrust forces thereby generated cancel each other.

In the example embodiment illustrated in FIG. 3, the insert defining the outlet cross-section 17 of the first outlet stub 13 or second outlet stub 14, respectively, consists of a three-armed baffle body 18, which is inserted and fixed into the connecting area 12 of the T-shaped connecting piece 10 in such a manner that the baffle body results in differently-sized outlet cross-sections required to inflate the differently sized airbag region volumes. The baffle body 18 again consists of a non-heat-resistant material. (In this specification and claims, the phrase "differently-sized outlet cross sections" includes an outlet stub or stubs in which a baffle or deflector device, e.g. baffle body 18, is installed such that unequal volumes of gas are discharged from the first and second outlet stubs.)

Figure 5:
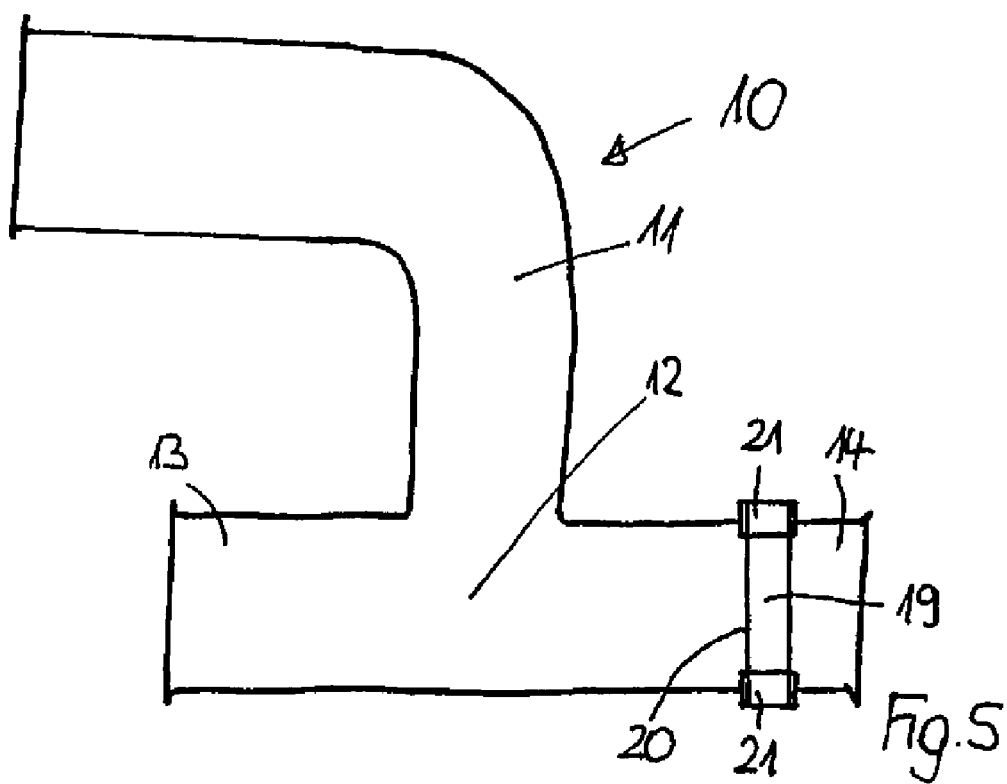
FIG. 5 is a representation of a T-shaped connector piece having a modified bolt insert.

In the example embodiments illustrated in FIGS. 4 and 5, the insert that adjusts the cross-section of outlet stubs 13 and 14 consists of a bolt 19, which, from the outside of the T-shaped connecting piece 10, is inserted or screwed into the associated outlet stub 13, engaging the walls in the latter case. The section 20 of the bolt 19 lying in the cross-section 20 or cavity of the associated outlet stub 13 consists of a non-heat-resistant material, whereas the section 21 seated in the wall of the connecting piece 10 consists of a heat-resistant material.

In the alternative illustrated in FIG. 5, the bolt 19, both of its end sections 21 consisting of a heat-resistant material, extends beyond its section 20 lying in the outlet cross-section or cavity of the outlet stub 13 into the associated walls of the outlet stub 13 and is thereby fixed to the connecting piece 10.

Figure 6:
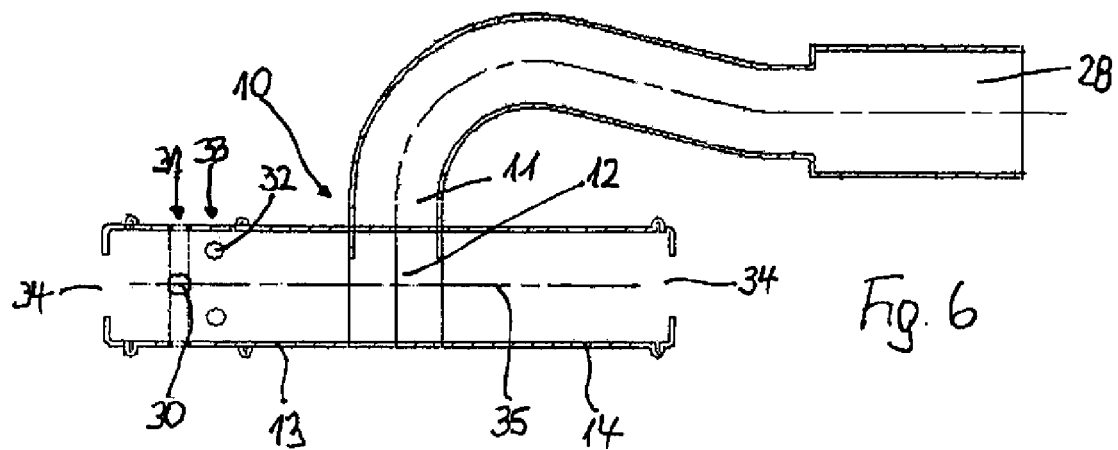
FIG. 6 is a representation of a T-shaped connecting piece having radially oriented discharge borings.

FIG. 6 illustrates another example embodiment of the invention. The connecting piece 10 has an inlet channel 11, which is attached to the gas generator 28 and to which the two outlet stubs 13, 14 are attached via a connection area 12, said outlet stubs each having discharge openings 34 of identical cross sections on their faces. A plurality of radially oriented discharge borings 30 and 32 are configured into the outlet stub 13, which is on the left in the illustration as per FIG. 6, a first plurality of discharge borings 30 being in a first plane 31 aligned perpendicular to the longitudinal axis 35 of the outlet stub 13, and a second plurality of two discharge borings 32 being in a second plane 33, which runs parallel to and apart from the first plane 31. The discharge openings 30 and 32 arranged in the two planes 31 and 33 are arranged rotationally symmetric in each of the two planes, but offset to one anther by an angle.

When the gas generator 28 is triggered to inflate the attached airbag regions 26 and 27, the gas enters the two attached outlet stubs 13 and 14 through the connection area 12 configured in connecting piece 10. The outlet stub 13, which is on the left in the drawing, has additional radially oriented discharge borings 30 and 32 so that this outlet stub 13 permits a larger gas flow overall than outlet stub 14 which lacks radial borings. But if the gas generator is triggered in the event of a fire, then the recoil or thrust forces which are generated by the escape of the generated gases from the discharge openings 34 on the faces of the two outlet stubs 13 and 14, cancel. Due to their radial orientation, the discharge borings 30 and 32 additionally provided in outlet stub 13 do not generate any axial thrust components, so that the airbag arrangement behaves thrust-neutral. The outlet stub of this embodiment, as well as the other embodiments discussed, may be attached to the airbag region hose. In this embodiment, the airbag region to be inflated either directly or by means of an intermediary connecting hose. In this embodiment, the airbag region or the connecting hose could be configured and appropriately attached to the outlet stub 13 so as to permit discharge borings 30 and 32 to function, for example, by overlapping the discharge borings and attaching the airbag near the neck of inlet 11.

Figure 7:
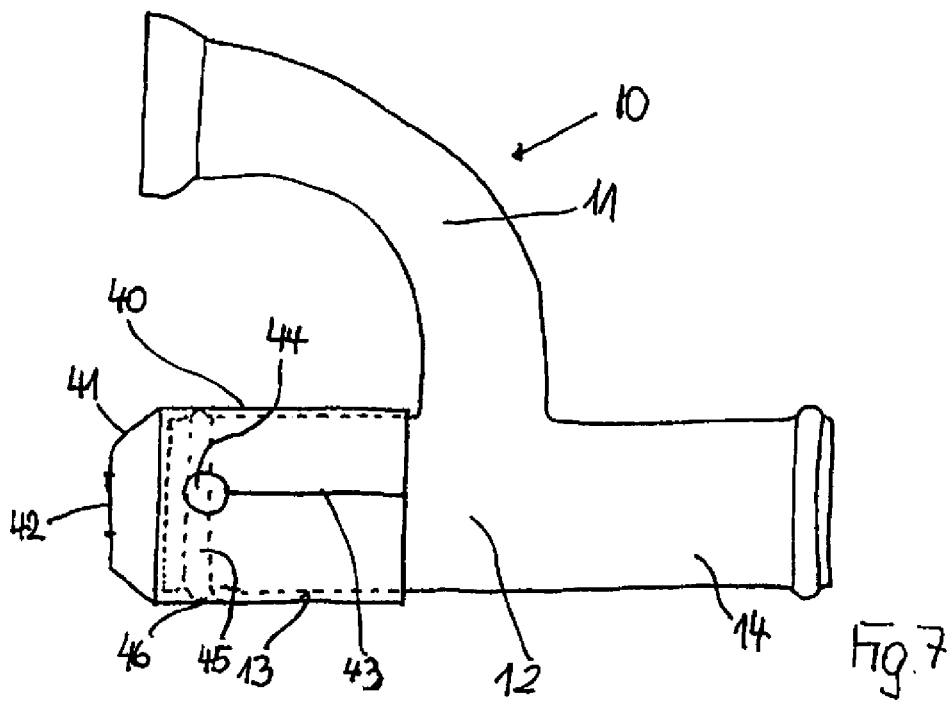
FIG. 7 is a representation of a T-shaped connecting piece having a bushing pushed onto an outlet stub.
Figure 8:
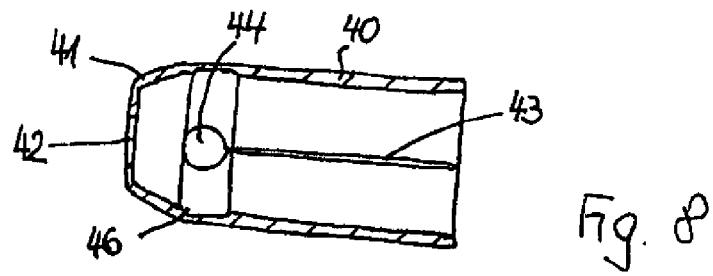
FIG. 8 is a sectional representation of the bushing from FIG. 7.

FIGS. 7 and 8 depict another example embodiment of the invention. The connecting piece 10 has an inlet channel 11 which is attached to the gas generator 28 and to which the two outlet stubs 13, 14, each having identical cross-sections, attach via a connection area 12. Pushed onto the outlet stub 13, which is depicted on the left in FIG. 2, is a bushing 40, which is configured cylindrically in the region to be pushed onto outlet stub 13. Bushing 40 has two slots 43, which are radially opposite one another, which proceed from the larger end of the bushing 40 on the thrust side, and terminate in a stop hole 44 in the front region. This makes it possible for the bushing 40 to expand somewhat when pushed onto the outlet stub 13 so that assembly is facilitated. On its other end, the bushing 40 has a region 41 that narrows outwards conically, the front of said region having an opening 42, the cross-section of which is smaller than the cross-section of the outlet stub 13.

If the open ends of the two outlet stubs 13 and 14 are provided with a surrounding flange 45, which may relate to the attachment of the associated airbag regions 26 and 27, then an associated groove 46, which snaps over the associated flange 45 and thereby locks when the bushing 40 is pushed onto the outlet stub 13, is configured on the inside wall of the bushing 40. After the associated airbag region 26 or 27 has been bound to the outside of the outlet stub 13 having the bushing 40, a collar band (not illustrated), which additionally secures the bushing 40, can be provided to further support the fixing of the bushing 40 on the outlet stub 13, enabling the bushing to cope with streaming pressure, which grows because of the smaller opening cross-section 42 of the bushing 40, particularly when the attached airbag 25 inflates.

The bushing 40 consists of a non-heat-resistant material, so that in the event of the action of heat in a fire and a corresponding undesired activation of the gas generator, the bushing 40 will melt or lose its function and thereby open the complete flow cross-section of the associated outlet channel 13, so that the symmetry of the configuration of the connecting piece 10 will arise. When the gas flowing in through the inlet channel 11 discharges from outlet stubs 13, 14, the recoil or thrust forces that this generates will cancel.

Although the above description constitutes one or more embodiments of the present invention, it will be appreciated that this invention is susceptible to modification, variation, and change without departing from the proper scope and fair meaning of the accompanying claims.

We claim:

1. An airbag system comprising:
   a gas generator;
   an airbag having at least two inflatable airbag regions;
   an interconnecting T-shaped connecting piece attached to the gas generator and to the airbag, and having two symmetrically opposed outlet stubs, wherein the outlet stubs have differently sized outlet cross sections, and further wherein each outlet stub has a discharge opening on its face; and
   a means for controlling the outlet cross section of at least one of the outlet stubs so that the airbag system produces substantially neutral thrust in a fire if the gas generator is activated.

2. An airbag system according to claim 1, wherein an insert comprised of non-heat-resistant material is arranged in at least one of the outlet stubs to reduce the cross-section of said outlet stub.

3. An airbag system according to claim 2, wherein the insert comprises a bolt introduced into the outlet stub from the outside of the connecting piece through a boring configured in a wall of the outlet stub and further wherein a portion of the bolt lying within an interior cavity of the outlet stub is comprised of a non-heat-resistant material.

4. An airbag system according to claim 3, wherein the bolt can be screwed into the boring, and further wherein the introduced end of the bolt reaches the opposite wall of the connecting piece, and further wherein the portions of the bolt lying within the walls of the are comprised of a heat-resistant material.

5. An airbag system according to claim 2, wherein the insert comprises a baffle plate having a defined outlet cross-section.

6. An airbag system according to claim 5, wherein at least two baffle plates having different outlet cross-sections are inserted into the outlet stubs.

7. An airbag system according to claim 2, wherein the insert comprises a three-armed baffle body inserted into a connecting area between the two outlet stubs and a central inlet stub attached to the gas generator.

8. An airbag system according to claim 1, wherein the area of at least one outlet cross section is reduced by means of a bushing fixed to at least one of the outlet stubs, said bushing being comprised of a non-heat-resistant material.

9. An airbag system according to claim 8, wherein the bushing is pushed onto the outlet stub.

10. An airbag system according to claim 8, wherein the bushing comprises at least one slot, which extends over a portion of its longitudinal length.

11. An airbag system according to claim 10, wherein the bushing comprises two slots circumferentially opposite one another.

12. An airbag system according to claim 10, wherein the slot terminates in a stop hole.

13. An airbag system according to claim 8, further comprising a flange surrounding the outside of the outlet stub and a groove formed around the inside wall of the bushing and located to mate with the flange.

14. An airbag system according to claim 8, further comprising a collar band securing the airbag to at least one of the outlet stubs.

15. An airbag system according to claim 8, wherein the bushing is internally pushed into the outlet stub and fixed within the outlet stub.

16. An airbag system according to claim 8, further comprising a collar band securing the bushing to at least one of the outlet stubs.

* * * * *

UNITED STATES PATENT AND TRADEMARK OFFICE
CERTIFICATE OF CORRECTION

PATENT NO.       : 7,669,894 B2                                                                Page 1 of 1
APPLICATION NO.  : 11/721322
DATED            : March 2, 2010
INVENTOR(S)      : Josephine Leo et al.

It is certified that error appears in the above-identified patent and that said Letters Patent is hereby corrected as shown below:

Title Page, Item (75) Inventors,

Under inventors, Per Hellberg, after Hellberg delete "Boras (SE)" and insert --Shanghai (CN)--.

Signed and Sealed this

Fifth Day of October, 2010

David J. Kappos
*Director of the United States Patent and Trademark Office*